Figure 1:
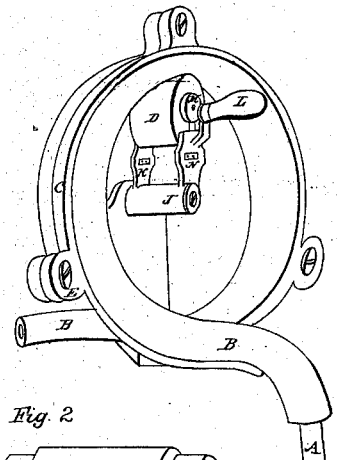
Figures 2, 3:
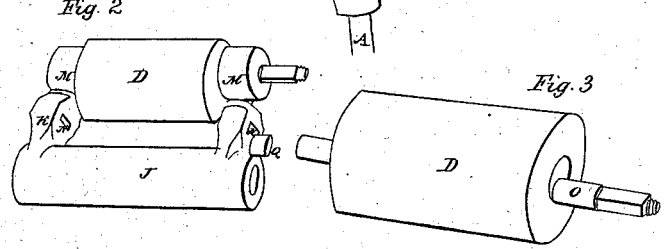
Figure 4:
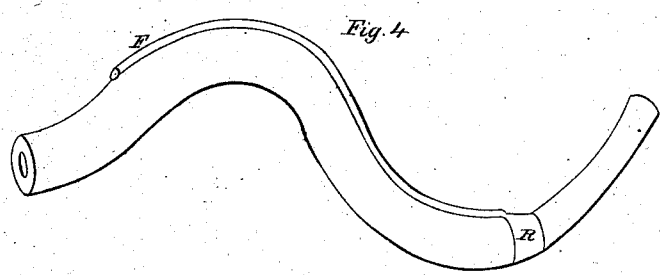
Figure 5:
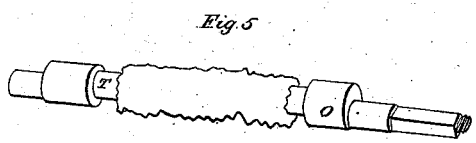
Figure 6:
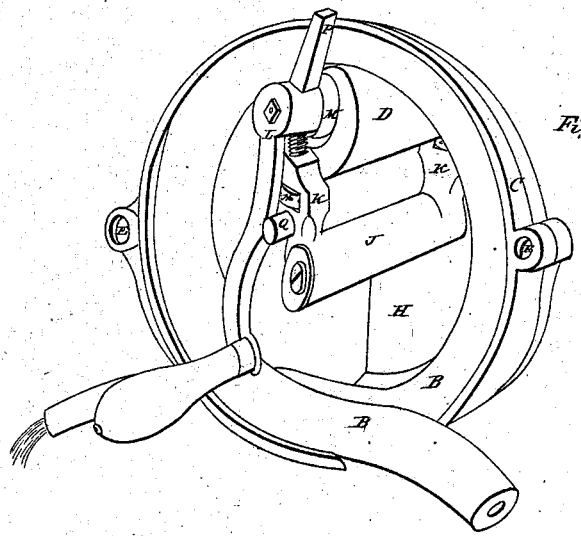
Figure 7:
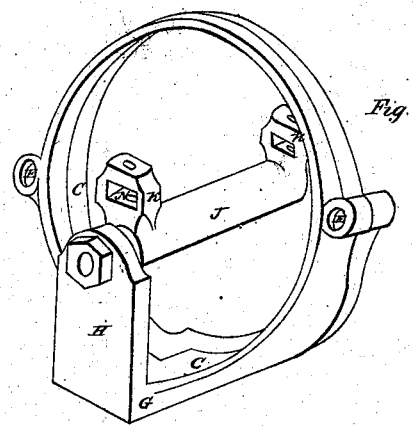
Figure 8:
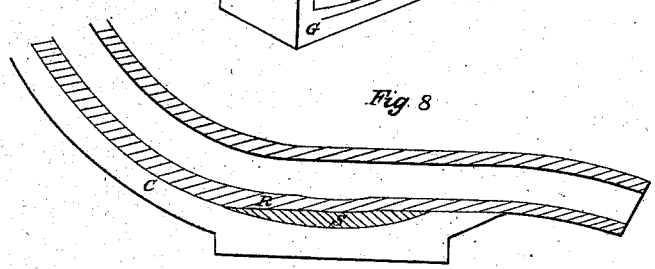

Sheet 1-2 Sheets.

Porter & Bradley.
Rotary Pump,

Nº 12,753.  Patented Apr. 17, 1855.

Porter & Bradley,

Rotary Pump,

Nº 12,753.    Patented Apr. 17, 1855.

UNITED STATES PATENT OFFICE.

RUFUS PORTER, OF WASHINGTON, DISTRICT OF COLUMBIA, AND J. D. BRADLEY, OF BRATTLEBORO, VERMONT.

ELASTIC-TUBE PUMP.

Specification of Letters Patent No. 12,753, dated April 17, 1855.

*To all whom it may concern:*

Be it known that we, RUFUS PORTER, of the city of Washington, in the District of Columbia, and J. D. BRADLEY, of Brattleboro, in the county of Windham and State of Vermont, have invented a new and useful Improvement in Pumping and Forcing Water and other Fluids, which we call our "Elastic-Tube Pump"; and we hereby declare that the following is a full and exact description thereof, reference being had to the accompanying drawings and to the letters of reference marked thereon.

The nature of our invention consists in the employment of an elastic tube which by its recovery from compression overcomes the atmospheric pressure, creates a vacuum within it, and draws the water or other fluid and by using pressure on the outside of this tube which by flattening and closing it expels or forces the fluid.

The conduit from the well (A) is made to terminate in a few feet of vulcanized india rubber hose (B) of sufficient thickness and elasticity to resist when empty the weight of the air. The hose is firmly attached to a stout cylindrical surface (C) so that when traversed by a roller (D) its several parts will be successively pressed and will in turn recover by their elasticity behind the roller thus producing the vacuum; while the roller's pressure forces or projects the water which is before it.

To perform the function of what in rotary pumps is called "the butment" we so arrange it that two places in the tube are closed at the same instant of time. This may be done either by giving the hose one entire coil, taking care that the roller is long enough to flatten both diameters at that part of the helix where they pass each other (as seen at Fig. I and Fig. VI); or it may be done by having the hose or hoses occupy each an arc of a circle and by so increasing the number of rollers as to insure the pressure of two at the same instant of time thus simultaneously closing each end of each segment of hose employed. The same effect may also be produced by fastening the hose on a plane surface, and by attaching several rollers to an endless chain or band which shall carry their axes in groves parallel with and sufficiently near to the plane to secure a pressure; always taking care that the forward roller shall not cease to press until its successor shall have closed the tube.

To enable others skilled in the art to make and use our invention we proceed to describe more particularly its construction and operation.

We procure from the manufactories of vulcanized india rubber a stout hose (see Fig. IV) of the most permanent elasticity; if the material be good, the spring of this tube will be sufficient, if its greatest thickness be half its caliber. When the well is not deep, the thickness may be diminished and the bore may be larger in proportion. This tube is firmly fastened onto some outside or inside cylindrical surface (C) against which when traversed by a roller, it may be pressed. When the inside cylindrical surface is used for that purpose, we save room and material by using (instead of a perfect cylinder) only a helical band (as exhibited in C, Fig. VII) and for conveniently attaching the hose to the inside of the band, the latter is cast in two parts capable of being closed together by screws (E) and capable of gripping and holding a bead or molding made for that purpose on one side of the hose (as seen at F Fig. IV). In order to carry around a roller within the coil when thus fastened we make one of the halves of the helical band a part of the same casting which forms the pedestal or platform by which the pump is fastened down (G, Fig. VII) and from this platform and forming part of the same casting a stout post (H Fig. VII) arises capable of holding firmly a central arbor or spindle (I, Fig. VII) to which a revolving socket is fitted (see J, Fig. VII). From near each end of which socket and forming part of the same casting with it two arms (K) project at right angles, capable of carrying around the roller and the arm which is farthest from the post is attached the crank handle or pulley which supplies the moving power (see L Fig. I and Fig. VII). In order to apply at pleasure a greater or less pressure on the hose the axis of the roller is carried around by two puppet-heads, (M) and these are governed by adjusting screws acted on by nuts held in mortises, one in each of the arms (as seen at N).

When it is desirable that the spring of the hose should be relieved, or that the water should recede as soon as the pressure ceases to act, we so arrange it as to produce what is equivalent to an elongation of the arms whenever power is applied to the crank; we produce this result by applying the crank to an eccentric axis of the roller (seen at O, Fig. III and Fig. V) and by extending a short arm of the crank's lever (P) so that it will in a little less than a semi revolution encounter a fulcrum (Q) protruding from the arm for that purpose (as seen at Q Fig. VI and Fig. II). This latter purpose may also be effected by applying the power at the central axis or upon its socket and by making joints in the arms which allow them to partially cripple when the power is withdrawn and to elongate by straightening when the power is applied. The two outer joints of the arms should in such case be cast together forming one piece having a crossbar cast with them to unite them, to insure uniformity of motion, and the two inner joints of the arms should be cast on the socket or axis. The same purpose may also be effected by an eccentric in the main axis or by cams on the main axis allowing however in such case the central arbor to revolve in stationary boxes and carry the cams instead of applying the power to a socket as above described. For the purpose of securing uniformity in the resistance to the roller we make that part of the hose where the helix has completed its circuit, (or in case of an arc the place where the foremost roller is about to leave the hose) a truncated cone (R, Fig. VI and Fig. VIII) tapering to a less thickness; so that the roller coming around to encounter again the resistance of the one end of the hose, will at the same instant of time at the other end have the full spring of the rubber behind but not the full spring before it. To insure however the closing of the tube at this cone we fasten under it a lift which corresponds with and compensates this diminution of thickness (S, Fig. VIII).

Another form of our machine would be to attach the coil or segments of hose to a circular plane disk and traverse them with conical rollers, the axes of which should diverge from a central revolving socket at an inclination from the plane of the disk while their sides in contact with the tube should be parallel with the plane. To relieve the rubber however and let the water recede or ceasing to pump, an open or many threaded screw might carry the socket onto a revolving collar farther up on the stationary central arbor, so that the rollers would press and close the tube; and on ceasing to turn the crank the spring of the rubber would throw the socket back from the collar onto corresponding threads of male screws attached firmly to the stationary central axis. Again, a form of the machine somewhat similar to this last may be made by attaching the tube to an outside or inside conical surface and by traversing the same with conical rollers and relieving the spring by the screw and collar.

The material we use for the elastic tube is as we have already said vulcanized india rubber; we are not yet sufficiently informed as to whether gutta percha can be made sufficiently elastic and durable. We have spoken of this tube as if it were a cylindrical tube—it may be varied in form and a prism or semi cylinder may be used; again—a metallic trough may be employed with a sheet of rubber stretched over it; thus employing the tensile elasticity instead of the resistance to compression; but we consider the cylindrical form the best. It is necessary that the rubber be so mixed and tempered as to retain its elasticity in cold weather. And when force pumps and condensers of great power are to be made it is to be so prepared as to produce a tougher and stronger article; but as these processes are the subjects of existing Letters Patent we omit all description of the details. We will add that in making force pumps and condensers it will be well to diminish the bore as well as the thickness of the cone and spout to avoid weakening those parts.

The material of the helical band and its post, as well as the socket and its arms may be of cast iron or other equally stiff metal. The puppet heads may be of malleable or annealed cast iron. The central spindle or main axis as well as the eccentric axis of the roller may be of wrought iron. The material of the roller may be of wood or metal or stoneware, but it is well to insert boxes of Babbitt metal for its journals.

A convenient mode of keeping the axis of the roller oiled, is to turn down its central portion (as seen at T Fig. V) and put on a loose cot of flannel cloth capable of being saturated with oil and gradually furnishing it to the journals.

We have contemplated the application of our principle to the pumping of ships—and should in such case for pumps of larger capacity have the central arbor revolve with cams on it which would protrude the arms. We have also contemplated its application to fire engines and other force pumps for projecting water, varying of course the gearing so as to adapt it to the power employed when of steam, horses or men; and increasing sufficiently the number of coils or arcs to give the requisite capacity. We have contemplated its application to air pumps and condensers of air and vapors; employing however two or more rollers on one coil. We have contemplated its application to the raising and moving substances of partial fluidity such as molasses and syrups of sugar in process of manufacture—using in this case only an arc of the hose which should be acted on by three or more rollers and placing this arc or segment on an upper limb of the circle so that the molasses will drain out from the spout as soon as the rollers recede on the withdrawal of the power. We have contemplated the application to pumps for scavengers for the cleaning of privies; covering the cast or portable receivers with a flanched sheet of india rubber and introducing the spout so that no offensive gases should escape. We have thought of using three or more rollers on this kind of pump and letting them act on a segment of hose of large bore, and of using stop-cocks on the spout so that by inverting the motion the pump, conduit, and even the privy would be rinsed or washed. We have also contemplated its application to the purposes of stomach pumps, and apparatus for injections.

What we claim as our invention and desire to secure by Letters Patent is as follows:

1. The mode of equalizing the resistance by a truncated cone of gradually diminishing thickness, by which the roller may leave the tube in combination with a lift S below, as hereinbefore specified.

2. The relieving the spring of the tube and the allowing the water to recede by means of jointed arms eccentrics or cams as hereinbefore specified.

3. The mode of attaching the tube to the helical band by means of forming the latter in two parts and by means of a bead or molding on the former as specified for the purposes set forth in the foregoing specification.

RUFUS PORTER.
J. D. BRADLEY.

Witnesses:
G. H. Moseley,
C. O. Chapin.